US011178689B2

(12) United States Patent
Takahashi et al.

(10) Patent No.: US 11,178,689 B2
(45) Date of Patent: Nov. 16, 2021

(54) USER APPARATUS AND BASE STATION APPARATUS

(71) Applicant: NTT DOCOMO, INC., Tokyo (JP)

(72) Inventors: Hideaki Takahashi, Tokyo (JP); Tooru Uchino, Tokyo (JP); Naoto Ookubo, Tokyo (JP); Ryusuke Matsukawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 5 days.

(21) Appl. No.: 16/638,392

(22) PCT Filed: Oct. 6, 2017

(86) PCT No.: PCT/JP2017/036529
§ 371 (c)(1),
(2) Date: Feb. 11, 2020

(87) PCT Pub. No.: WO2019/038935
PCT Pub. Date: Feb. 28, 2019

(65) Prior Publication Data
US 2020/0367282 A1 Nov. 19, 2020

(30) Foreign Application Priority Data
Aug. 23, 2017 (JP) ............................ JP2017-160640

(51) Int. Cl.
*H04W 74/04* (2009.01)
*H04W 72/04* (2009.01)
*H04W 74/00* (2009.01)

(52) U.S. Cl.
CPC ....... *H04W 74/04* (2013.01); *H04W 72/0453* (2013.01); *H04W 74/004* (2013.01); *H04W 74/006* (2013.01)

(58) Field of Classification Search
CPC ......... H04W 36/0072; H04W 72/0453; H04W 74/004; H04W 74/006; H04W 74/04; H04W 74/0833
See application file for complete search history.

(56) References Cited

U.S. PATENT DOCUMENTS

2016/0183299 A1* 6/2016 Fang ....................... H04W 4/06 370/329
2017/0135134 A1* 5/2017 Rune ................ H04W 74/0833
2017/0231011 A1* 8/2017 Park .................... H04W 74/006

OTHER PUBLICATIONS

International Search Report issued in PCT/JP2017/036529 dated Oct. 31, 2017 (5 pages).

(Continued)

*Primary Examiner* — Kashif Siddiqui
(74) *Attorney, Agent, or Firm* — Osha Bergman Watanabe & Burton LLP

(57) ABSTRACT

A user apparatus that communicates with a base station apparatus is provided. The user apparatus includes a reception unit configured to receive, from the base station apparatus, an indication for an individual random access preamble, information indicating correspondence to non-contention based random access procedure, and a random access response; a transmission unit configured to transmit the individual random access preamble to the base station apparatus; and a control unit configured to, in response to receiving the random access response to the individual random access preamble, the random access response being transmitted from the base station apparatus, determine whether the random access procedure has been successfully completed based on the information indicating correspondence to the non-contention based random access procedure.

5 Claims, 8 Drawing Sheets

100
BASE STATION APPARATUS
200
USER APPARATUS
RANDOM ACCESS PROCEDURE START
RANDOM ACCESS PREAMBLE ASSIGNMENT
S21
RANDOM ACCESS PREAMBLE
S22
RANDOM ACCESS RESPONSE
S23
RANDOM ACCESS PROCEDURE COMPLETE

(56) References Cited

OTHER PUBLICATIONS

Written Opinion of the International Searching Authority issued in PCT/JP2017/036529 dated Oct. 31, 2017 (5 pages).
Huawei et al.; "Backward compatibility of contention-free RA in NB-IoT"; 3GPP TSG-RAN WG2 Meeting #99, R2-1709680; Berlin, Germany; Aug. 21-25, 2017 (5 pages).
NTT Docomo, Inc.; "Discussion on Non-contention based RA procedure for NB-IoT"; 3GPP TSG-RAN WG2 Meeting #99, R2-1709692; Berlin, Germany; Aug. 21-25, 2017 (4 pages).
Huawei et al.; "Correction to contention free random access"; 3GPP TSG-RAN2 Meeting #99, R2-1709707; Berlin, Germany; Aug. 21-25, 2017 (10 pages).
Huawei et al.; "Correction to contention free random access"; 3GPP TSG-RAN2 Meeting #99, R2-1709706; Berlin, Germany; Aug. 21-25, 2017 (3 pages).
3GPP TS 36.211 V14.3.0; "3rd Generation Partnership Project; Technical Specification Group Radio Access Network; Evolved Universal Terrestrial Radio Access (E-UTRA); Physical channels and modulation (Release 14)"; Jun. 2017 (195 pages).
3GPP TS 36.213 V14.3.0; "3rd Generation Partnership Project; Technical Specification Group Radio Access Network Evolved Universal Terrestrial Radio Access (E-UTRA); Physical layer procedures (Release 14)"; Jun. 2017 (460 pages).
Office Action issued in the counterpart Japanese Patent Application No. 2019-537548, dated Mar. 23, 2021 (5 pages).
ZTE Corporation; "Resources selection for PRACH triggered by a PDCCH order in eNB-IoT(Option2)"; 3GPP TSG-RAN2 Meeting #98, R2-1705462; Hangzhou, China; May 15-19, 2017 (10 pages).
3GPP TSG-RAN WG2 Meeting#98; R2-1705417 "Discussion on resources selection for PRACH triggered by a PDCCH order in eNB-IoT" ZTE; Hangzhou, China; May 15-19, 2017 (4 pages).
Extended European Search Report issued in European Application No. 17922582.6, dated Apr. 13, 2021 (8 pages).

* cited by examiner

FIG.5

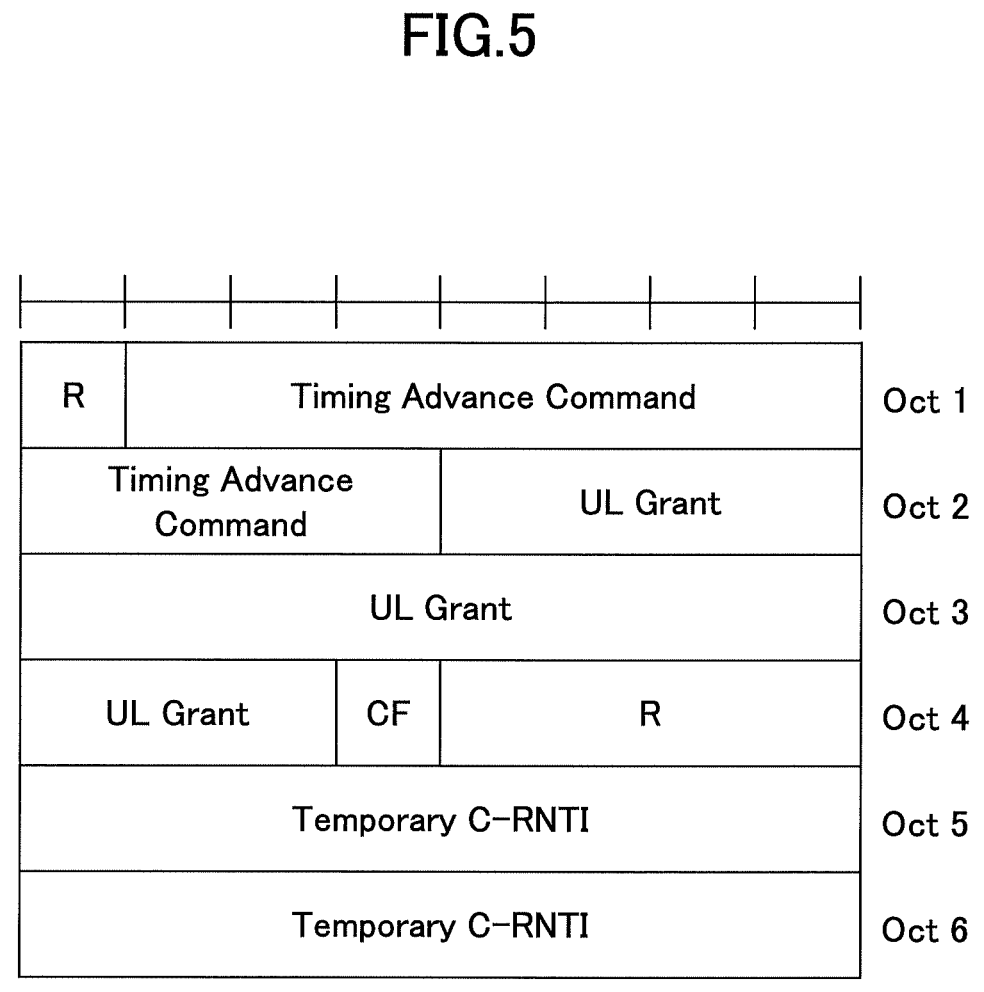

| Fields | | | |
|---|---|---|---|
| R | Timing Advance Command | | Oct 1 |
| Timing Advance Command | UL Grant | | Oct 2 |
| UL Grant | | | Oct 3 |
| UL Grant | CF | R | Oct 4 |
| Temporary C-RNTI | | | Oct 5 |
| Temporary C-RNTI | | | Oct 6 |

(A)
Nprach-NumCBRA-Startsubcarriers
Nprach-Numsubcarriers
Preamble selected by eNB
ra-preamble
0 #1 #2 #3 #4 #5 #6 #7 #8 #9 #10 #11 ... ... #23 ...
Preamble selected by Rel-13 UE and Rel-14 UE
(B)
Nprach-NumCBRA-Startsubcarriers
Nprach-Numsubcarriers
Preamble selected by eNB
ra-preamble
0 #1 #2 #3 #4 #5 #6 #7 #8 #9 #10 #11 ... ... #23 ...
Preamble selected by Rel-13 UE
Preamble selected by Rel-14 UE

USER APPARATUS AND BASE STATION APPARATUS

BACKGROUND OF THE INVENTION

1. Field of the Invention

The present invention relates to a user apparatus and a base station apparatus in a wireless communication system.

2. Description of the Related Art

In 3GPP (3rd Generation Partnership Project), NB-IoT (Narrow Band-Internet of Things) is being discussed, which will realize decreased terminal costs and extremely lowered power consumption by decreasing the throughput and by reducing the modem complexity (e.g., Non-Patent Document 1).

In NB-IoT, for example, the coverage will be increased by adopting a technique in which signals are repeatedly transmitted while the bandwidth is limited to 200 kHz or less (e.g., Non-Patent Document 2).

CITATION LIST

Non-Patent Document

[Non-Patent Document 1] 3GPP TS36.211 V14.3.0 (2017-06)

[Non-Patent Document 2] 3GPP TS36.213 V14.3.0 (2017-06)

SUMMARY OF THE INVENTION

Technical Problem

In NB-IoT, a user apparatus receives, from a base station apparatus, information that is necessary for initial access, and performs Contention Based Random Access. The information that is necessary for initial access includes information that specifies a resource and a preamble signal format. Further, for example, the user apparatus receives, from the base station apparatus, an indication for a specific preamble signal format via a handover command at the time of handover or via a PDCCH (Physical Downlink Control Channel) at the time of downlink data generation, and performs Non-contention Based Random Access.

Here, it is necessary that the state of the user apparatus match the state of the base station apparatus with respect to whether Contention Based Random Access is to be performed or Non-contention Based Random Access is to be performed. However, unmatched states may occur between the user apparatus and the base station apparatus.

The present invention has been made in view of the above. An object of the present invention is to properly complete a random access procedure performed by a user apparatus and a base station apparatus in a wireless communication system.

Solution to Problem

According to an embodiment of the present invention, a user apparatus that communicates with a base station apparatus is provided. The user apparatus includes a reception unit configured to receive, from the base station apparatus, an indication for an individual random access preamble, information indicating correspondence to a non-contention based random access procedure, and a random access response; a transmission unit configured to transmit the individual random access preamble to the base station apparatus; and a control unit configured to determine whether the random access procedure is successfully completed based on the information indicating correspondence to the non-contention based random access procedure in response to receiving the random access response to the individual random access preamble, the random access response being transmitted from the base station apparatus.

Advantageous Effects of Invention

According to an embodiment of the present invention, it is possible to properly complete a random access procedure performed by a user apparatus and a base station apparatus in a wireless communication system.

BRIEF DESCRIPTION OF THE DRAWINGS

FIG. 5 is an example of a MAC payload of a random access response according to an embodiment of the present invention.

DETAILED DESCRIPTION OF THE PREFERRED EMBODIMENTS

Figure 1:
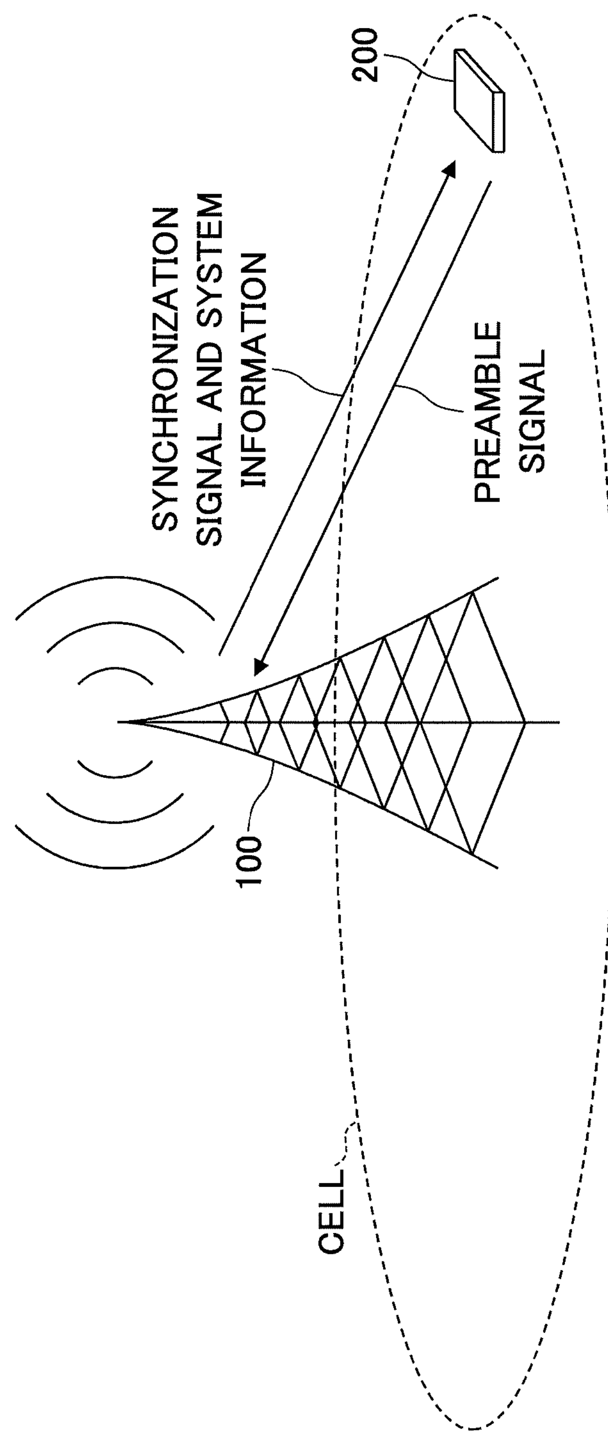
FIG. 1 is a drawing illustrating a configuration example of a wireless communication system according to an embodiment of the present invention.

In the following, referring to the drawings, an embodiment of the present invention will be described. It should be noted that the embodiments described below are examples. Embodiments of the present invention are not limited to the following embodiments.

In operations of a wireless communication system according to an embodiment of the present invention, conventional techniques will be used appropriately. With respect to the above, for example, the conventional techniques are related to, but not limited to, the existing LTE. Further, it is assumed that the term "LTE" used in the present specification has, unless otherwise specifically mentioned, a broad meaning including a scheme of LTE-Advanced and a scheme after LTE-Advanced (e.g., NR).

Further, in the following embodiments, the terms such as SS (Synchronization Signal), PSS (Primary SS), SSS (Secondary SS), PBCH (Physical broadcast channel), PRACH (Physical RACH), etc., are used for the sake of convenience. Signals, functions, etc., similar to the above, may be referred to different terms.

<System Configuration>

FIG. 1 is a drawing illustrating a configuration example of a wireless communication system according to an embodiment of the present invention. As illustrated in FIG. 1, the wireless communication system includes a base station apparatus 100 and a user apparatus 200. In FIG. 1, a single base station apparatus 100 and a single user apparatus 200 are illustrated as examples. There may be a plurality of the base station apparatuses 100 and a plurality of the user apparatuses 200.

The base station apparatus 100 is a communication apparatus that provides one or more cells and performs wireless communications with the user apparatus 200. As illustrated in FIG. 1, the base station apparatus 100 transmits a synchronization signal and system information to the user apparatus 200. The synchronization signal is, for example, a PSS and/or a SSS. The system information is transmitted, for example, via a PBCH. Further, the system information may be referred to as broadcast information. The base station apparatus 100 and the user apparatus 200 are enabled to transmit and receive a signal by performing the beam forming. The user apparatus 200 may be a communication apparatus that has wireless communication functions of a communication module corresponding to NB-IoT, and of a communication module for a smart-phone, a mobile phone, a tablet, a wearable terminal, or M2M (Machine-to-Machine). The user apparatus 200 is wirelessly connected to the base station apparatus 100, and uses various communication services provided by the wireless communication system. As illustrated in FIG. 1, in an initial access stage, the user apparatus 200 transmits a random access preamble signal to the base station apparatus 100. The random access is performed based on, in addition to system information received from the base station apparatus 100 via PBCH, system information received via PDSCH.

It should be noted that, in an embodiment of the present invention, the duplex method may be TDD (Time Division Duplex), FDD (Frequency Division Duplex), or other methods (e.g., Flexible Duplex, or the like).

Further, in the following descriptions, "transmitting a signal by using a transmission beam" may be replaced by "transmitting a precoding-vector-multiplied signal (a signal precoded by a precoding vector)". Similarly, "receiving a signal by using a reception beam" may be replaced by "multiplying the received signal by a predetermined weight vector." Further, "transmitting a signal by using a transmission beam" may be expressed by "transmitting a signal via a specific antenna port". Similarly, "receiving a signal by using a reception beam" may be expressed by "receiving a signal via a specific antenna port." The antenna port refers to a logical antenna port or a physical antenna port defined in 3GPP standards.

Embodiment 1

In the following, an embodiment 1 will be described.

Figure 2:
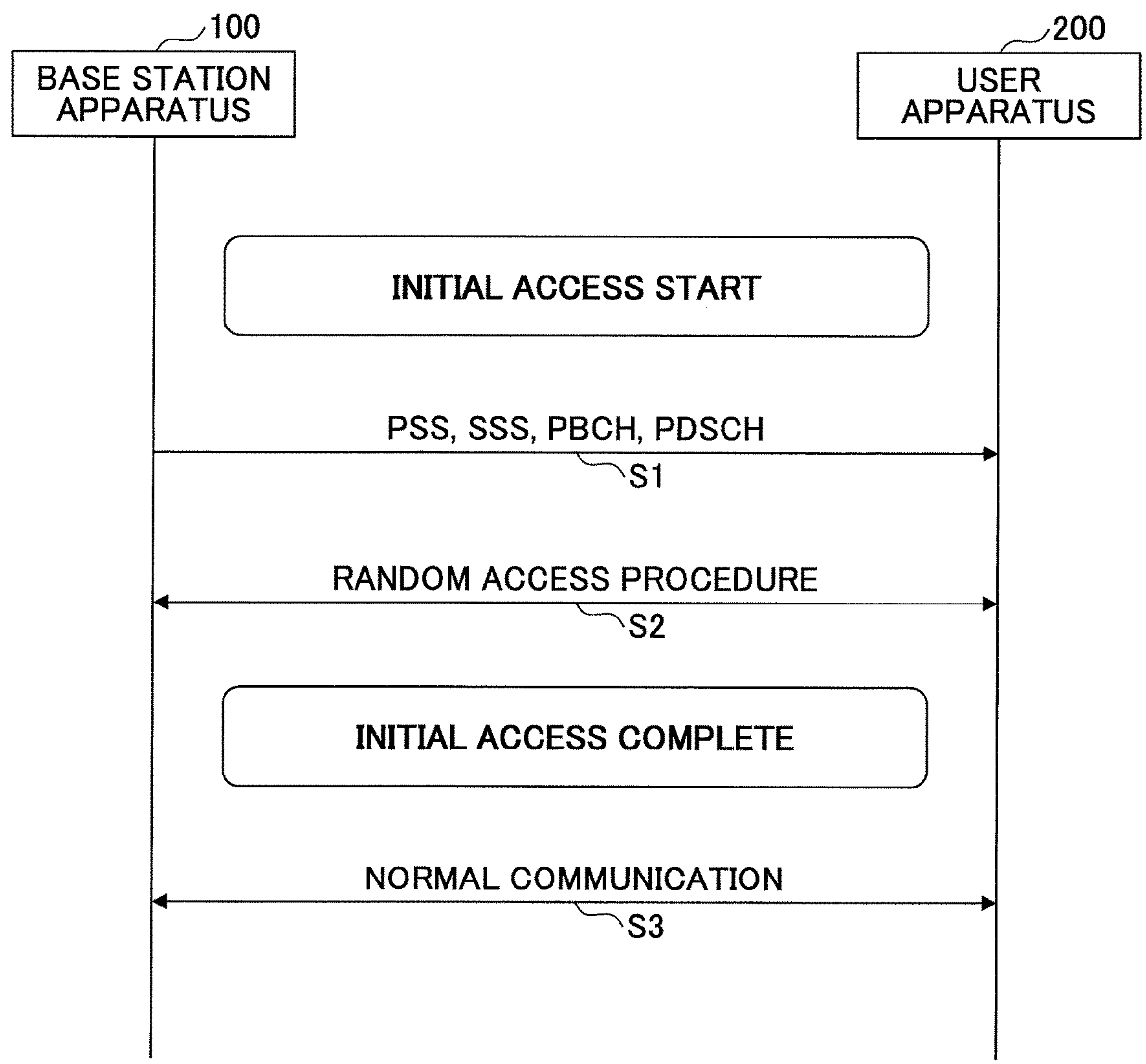
FIG. 2 is an example of an initial access sequence according to an embodiment of the present invention.

FIG. 2 is an example of an initial access sequence according to an embodiment of the present invention. When an initial access is started, in step S1, the base station apparatus 100 transmits a PSS, a SSS, and a PBCH to the user apparatus 200. A part of system information is included in the PBCH.

With respect to the above, the user apparatus 200 receives the PSS transmitted from the base station apparatus 100, and uses the PSS for identifying at least a part of initial time, frequency synchronization, and a cell ID (identity). Further, the user apparatus 200 receives the SSS transmitted from the base station apparatus 100, and uses the SSS for identifying at least a part of the cell ID. Further, the user apparatus 200 receives the PBCH transmitted from the base station apparatus 100, and obtains a part of system information necessary for the initial access such as a system frame number (SFN) and information used for obtaining other system information. The other system information may be received via a PDSCH. The other system information includes information for identifying a resource for performing a random access procedure (i.e., a RACH resource), and information for identifying a preamble format, or the like. The user apparatus 200 starts the random access procedure by transmitting a preamble via the identified RACH resource (S2).

When the random access procedure between the base station apparatus 100 and the user apparatus 200 is successful in step S2, the initial access is completed and a normal communication is started (S3).

Figure 3:
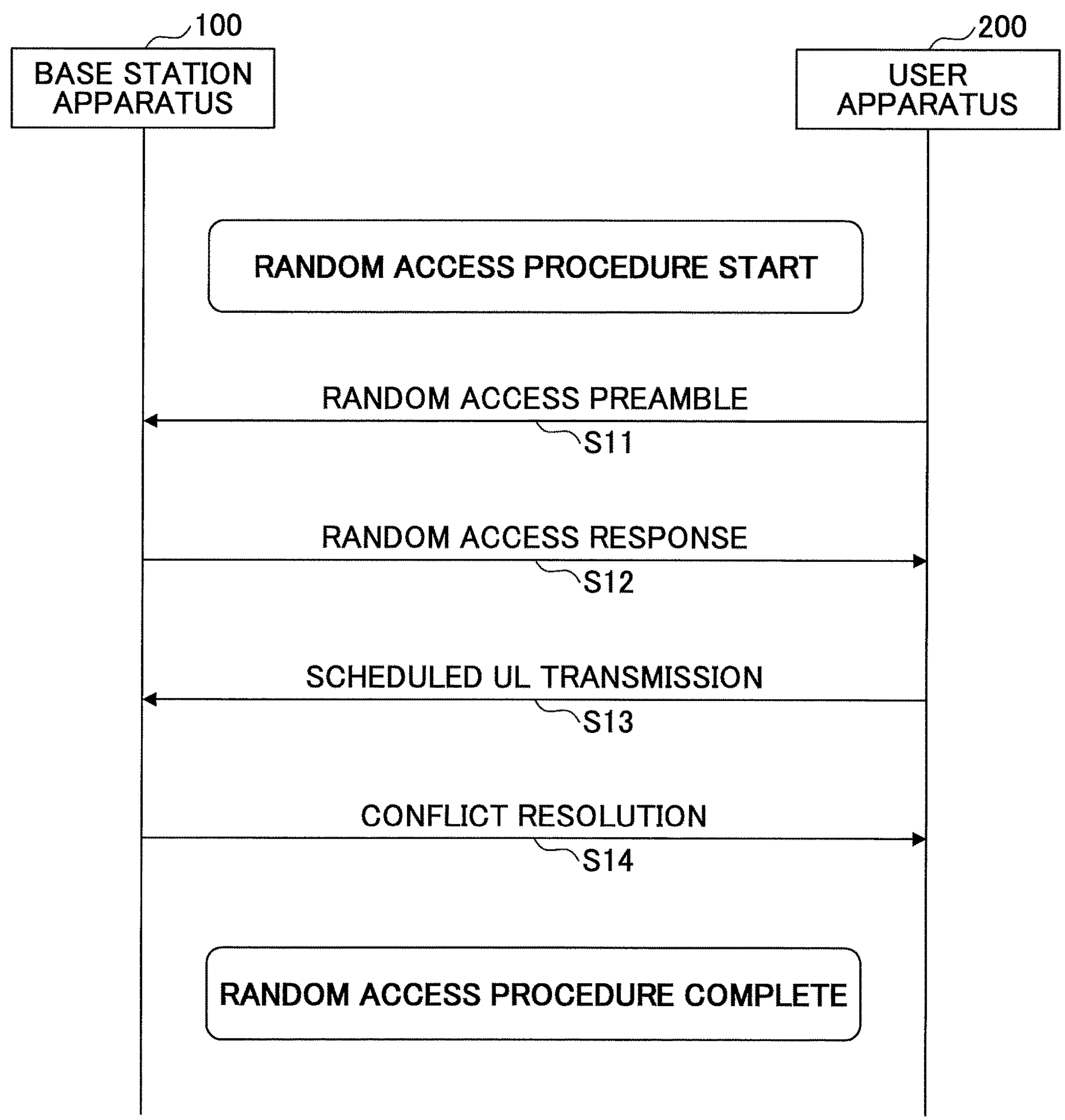
FIG. 3 is a drawing illustrating a contention based random access procedure according to an embodiment of the present invention.

FIG. 3 is a drawing illustrating a contention based random access procedure according to an embodiment of the present invention. When the random access procedure is started, in step S11, the user apparatus 200 transmits a random access preamble to the base station apparatus 100 based on the system information received from the base station apparatus 100.

Next, in step S12, the base station apparatus 100 transmits a random access response to the user apparatus 200. The random access response is a response to the random access preamble, and is addressed to and transmitted to an RA-RNTI (Random Access-Radio Network Temporary Identifier) via a PDCCH. The random access response includes at least an identifier of the random access preamble, a timing alignment, an initial uplink grant, and a temporary C-RNTI (Temporary Cell-Radio Network Temporary Identifier).

Next, in step S13, the user apparatus 200 performs uplink transmission based on the uplink grant included in the random access response. In the uplink transmission, at least an RRC (Radio Resource Control) connection request, a NAS (Non-Access Stratum) UE (User Equipment) identifier may be transmitted, and, in NB-IoT, an indication for a data amount of the subsequent transmissions via an SRB (Signaling Radio Bearer) or via a DRB (Data Radio Bearer) may be transmitted.

Next, in step S14, a contention resolution is performed. A predetermined MAC (Medium Access Control) control element, addressed to the temporary C-RNTI, is transmitted from the base station apparatus 100 to the user apparatus 200 via a PDCCH. In the case where the MAC control element matches a part of the data transmitted in step S13, it is assumed that the random access is successful, and the user apparatus 200 completes the random access procedure by changing the temporary C-RNTI to a C-RNTI.

Figure 4:
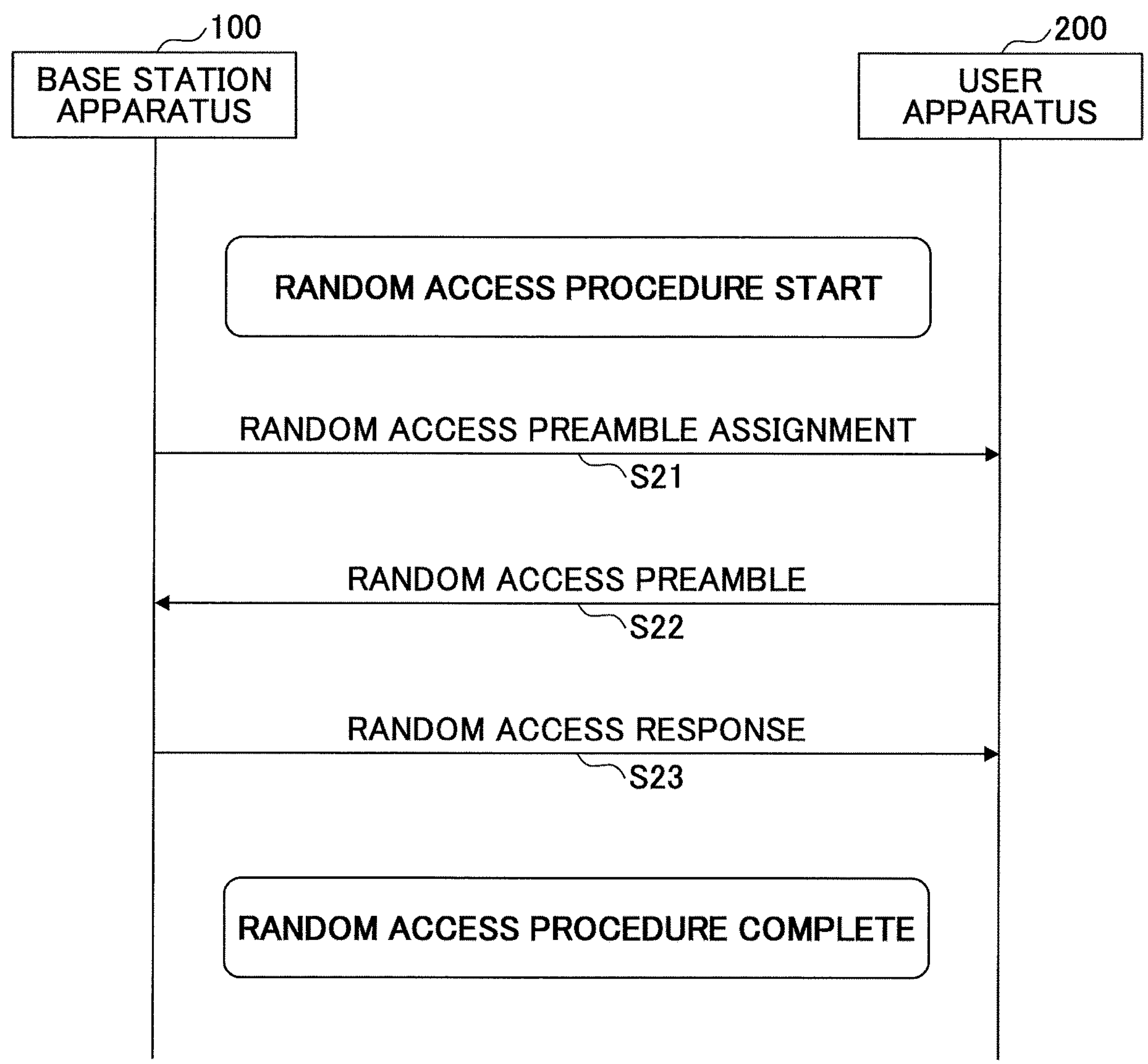
FIG. 4 is a drawing illustrating a non-contention based random access procedure according to an embodiment of the present invention.

FIG. 4 is a drawing illustrating a non-contention based random access procedure according to an embodiment of the present invention. When the random access procedure is started, in step S21, the user apparatus 200 receives an indication for a random access preamble from the base station apparatus 100. The indication for a random access preamble is individually assigned to the user apparatus 200, and is not included in a range of available contention based preambles that are broadcast via system information. Different from the initial access, the user apparatus 200 is in a connected state when starting the non-contention based access procedure. The indication for the individually assigned random access preamble may be generated by, for example, a target eNB (enhanced NodeB) at the time of handover, and transmitted to the user apparatus 200 at the time of an RRC handover command transmission from a source eNB, at the time of downlink data occurrence, at the time of initial uplink timing alignment adjustment, etc.

Next, in step S22, the user apparatus 200 transmits the random access preamble, indicated in step S21, to the base station apparatus 100.

Next, in step S23, the base station apparatus 100 transmits a random access response to the user apparatus 200. The random access response is a response to the random access preamble, and is transmitted with an address to an RA-RNTI (Random Access-Radio Network Temporary Identifier) via a PDCCH. The random access response includes at least an identifier of the random access preamble and timing alignment. In the case where the random access response is properly received, it is assumed that the random access is successful, and the user apparatus 200 completes the random access procedure. When it is assumed that the random access is successful, in NB-IoT, the user apparatus 200 assumes that an uplink grant included in the PDCCH transmission is effective only in the set carrier.

Here, in order to reduce the complexity, the non-contention based random access is not supported by the user apparatus 200 in NB-IoT of 3GPP Rel-13. However, as an alternative, it is possible to indicate non-contention random access preamble to the user apparatus 200 by transmitting a parameter nprach-NumCBRA-StartSubcarriers that indicates a start position of a subcarrier of a contention based random access preamble. The available random access preambles are divided into two subsets. One of the subsets is used as contention based random access preambles and the other is used as non-contention based random access preambles. However, with respect to the random access procedure, the contention based random access procedure is used in common.

With respect to the above, in NB-IoT of 3GPP Rel-14, there is consideration of the user apparatus 200 supporting the non-contention based random access procedure. In other words, there may be a case in which a NB-IoT user apparatus 200 that supports the non-contention based random access procedure and a NB-IoT user apparatus 200 that does not support the non-contention based random access procedure coexist.

Because the user apparatus 200 of Rel-14 in NB-IoT supports the non-contention based random access procedure as described above, in the case where an indication for a preamble to be used has been transmitted from the base station apparatus 100, the user apparatus 200 determines that the random access procedure is successfully completed when the random access response transmitted from the base station apparatus 100 is successfully received.

Here, for example, operations will be described in the case where an indication for a random access preamble to be used is transmitted from the base station apparatus 100 to the user apparatus 200 via a PDCCH Order triggered by occurrence (arrival) of downlink data, or the like.

In the case where an indication for a random access preamble is individually transmitted to a user apparatus 200 of NB-IoT, the base station apparatus 100 of Rel-13 performs operations by assuming that the procedure is the contention based random access procedure. Therefore, in the case where the user apparatus 200 of NB-IoT is in compliance with Rel-13, the random access procedure will be properly completed because the base station apparatus 100 and the user apparatus 200 perform the random access procedure by both assuming that the procedure is the contention based random access procedure.

However, in the case where the user apparatus 200 of NB-IoT is in compliance with Rel-14, the random access procedure cannot be properly completed because of the fact that the base station apparatus 100 performs the random access operations by assuming that the procedure is the contention based random access procedure, while the user apparatus 200 performs the random access procedure by assuming that the procedure is the non-contention based random access procedure, and that the state of the user apparatus 200 does not match the state of the base station apparatus 100. In other words, the base station apparatus 100 expects the scheduled UL transmission illustrated in step S13 in FIG. 3, while the user apparatus 200 completes the random access procedure at the time of receiving the random access response in step S23 in FIG. 4, and thus, the random access procedure fails.

With respect to the above, it is possible to cause the random access procedure presumed (assumed, expected) by the base station apparatus 100 to match the random access procedure presumed (assumed, expected) by the user apparatus 200 by adding, to the random access response, information indicating whether the random access response corresponds to the non-contention based random access procedure or to the contention based random access procedure.

FIG. 5 is an example of a MAC payload of a random access response according to an embodiment of the present invention. As illustrated in FIG. 5, a "CF" field is newly set in the MAC payload included in the random access response. For example, in the case where "CF=1", it is indicated that the random access response corresponds to the non-contention based random access procedure, and, in the case where "CF=0", it is indicated that the random access response corresponds to the contention based random access procedure. As illustrated in FIG. 5, for example, the "CF" field may be arranged at a bit in the fourth octet of the MAC payload.

Further, a process of determining the "CF" field is added to the random access procedure as described below. It should be noted that it is assumed that the indicated preamble is not "000000".

1) In the case where the random access response is successfully received, where the user apparatus 200 does not correspond to NB-IoT, and where an indication for a preamble has been transmitted from the base station apparatus 100 to the user apparatus 200, the user apparatus 200 determines that the random access procedure is completed.

2) In the case where the random access response is successfully received, where the user apparatus 200 corresponds to NB-IoT, where an indication for a preamble has been transmitted from the base station apparatus 100 to the user apparatus 200, and where the "CF" field is "1", the user apparatus 200 determines that the random access procedure is completed.

As described above, by introducing the "CF" field, it is possible to enable (cause) a state of the base station apparatus 100 in which the random access procedure is the non-contention based random access procedure to match a state of the user apparatus 200 in which the random access procedure is the non-contention based random access procedure, and it is possible to properly complete the random access procedure.

Figure 6:
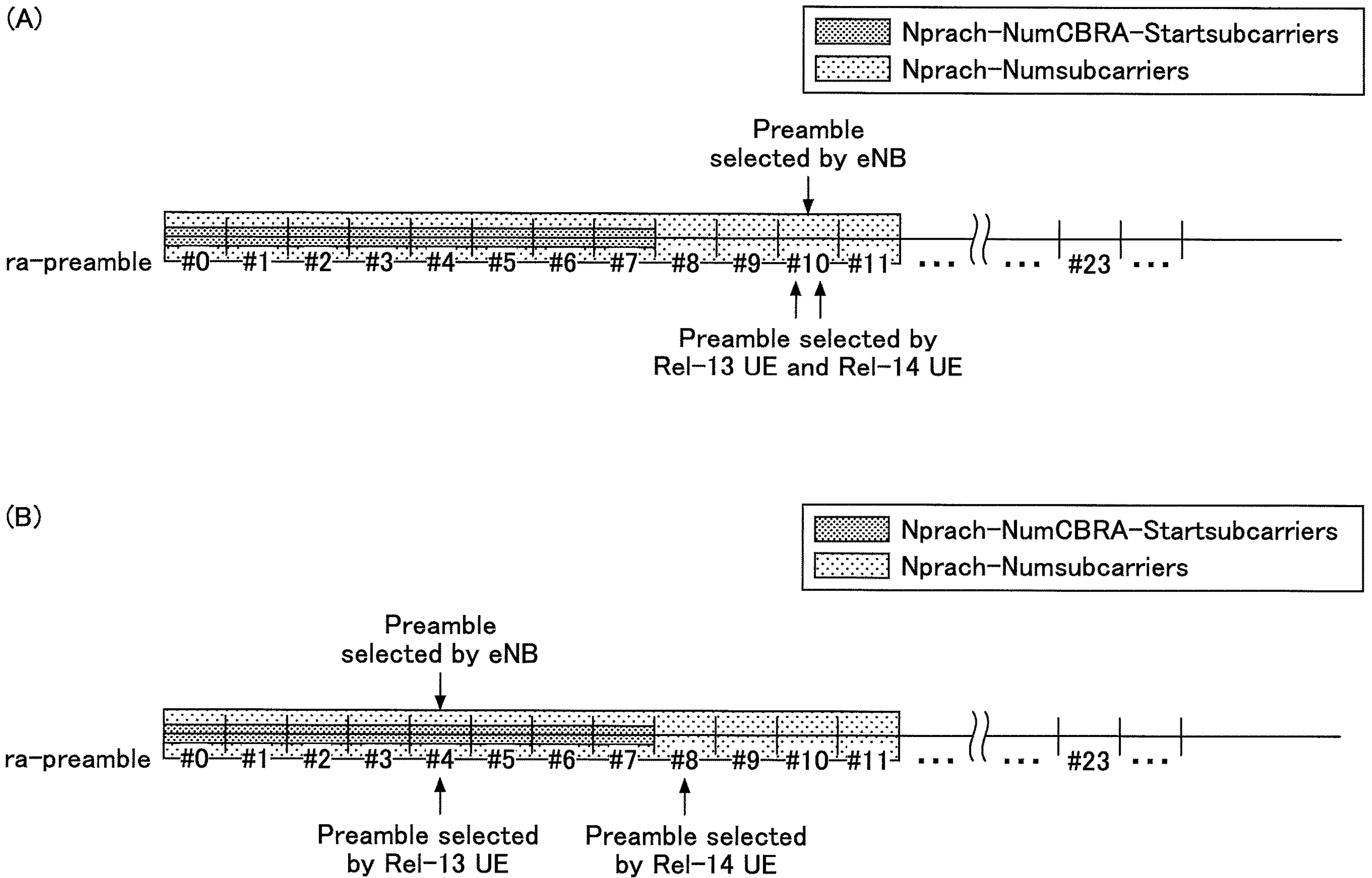
FIG. 6 is a drawing illustrating preamble selection in a non-contention based random access procedure according to an embodiment of the present invention.

FIG. 6 is a drawing illustrating preamble selection in a non-contention based random access procedure according to an embodiment of the present invention. In the case where an indication for a preamble in the non-contention based random access is transmitted from the base station apparatus 100 to the user apparatuses 200 in NB-IoT, there is a possibility that different preamble sub-carriers are selected by the user apparatuses 200 according to the corresponding releases, that is, Rel-13 and Rel-14.

In Rel-14, the sub-carrier of the indicated preamble is selected based on the following formula. nprach-SubcarrierOffset+nprach-NumCBRA-StartSubcarriers+(ra-PreambleIndex modulo (nprach-NumbSubcarriers−nprach-NumCBRA-StartSubcarriers))

The parameter "nprach-SubcarrierOffset" indicates a position of a NPRACH resource on the frequency axis.

The parameter "nprach-NumCBRA-StartSubcarriers" indicates the number of starting sub-carriers for contention based NPRACH resources on the frequency axis. The starting sub-carrier should be randomly selected. An index of the starting sub-carrier of the NPRACH resources is given by nprach-SubcarrierOffset+[0, nprach-NumCBRA-StratSubcarriers −1].

The parameter "ra-PreambleIndex" is an index that specifies a signal format of the preamble.

The parameter "nprach-NumSubcarriers" indicates the number of sub-carriers in the NPRACH resources.

With respect to the above, in Rel-13, the sub-carrier of the indicated preamble is selected based on the following formula.

nprach-SubcarrierOffset+(ra-PreambleIndex modulo nprach-NumSubcarriers)

The following is assumed as conditions of preamble selection illustrated in FIG. 6. nprach-SubcarrierOffset=0, 12, 24 for each CE level nprach-NumSubcarriers=12 nprach-NumCBRA-StartSubcarriers=8

As illustrated in FIG. 6(A), in the case where ra-PreambleIndex=10, the preamble sub-carriers that are selected by the base station apparatus 100 of Rel-13, by the user apparatus 200 of Rel-13, and by the user apparatus 200 of Rel-14 based on the above formulas are of the same index "#10" as shown below.

In Rel-13, nprach-SubcarrierOffset+(ra-PreambleIndex modulo nprach-NumSubcarriers)=nprach-SubcarrierOffset+(10 modulo 12)=nprach-SubcarrierOffset+10.

In Rel-14, nprach-SubcarrierOffset+nprach-NumCBRA-StartSubcarriers+(ra-PreambleIndex modulo (nprach-NumSubcarriers−nprach-NumCBRA-StartSubcarriers))=nprach-SubcarrierOffset+8+(10 modulo (12-8))=nprach-SubcarrierOffset+10.

With respect to the above, as illustrated in FIG. 6(B), in the case where ra-PreambleIndex=4, the preamble sub-carriers that are selected by the base station apparatus 100 of Rel-13 and by the user apparatus 200 of Rel-13 based on the above formulas are an index "#4" as shown below. However, the preamble sub-carrier that is selected by the user apparatus 200 of Rel-14 based on the above formula is an index "#8".

In Rel-13, nprach-SubcarrierOffset+(ra-PreambleIndex modulo nprach-NumSubcarriers)=nprach-SubcarrierOffset+(4 modulo 12)=nprach-SubcarrierOffset+4.

In Rel-14, nprach-SubcarrierOffset+nprach-NumCBRA-StartSubcarriers+(ra-PreambleIndex modulo (nprach-NumSubcarriers−nprach-NumCBRA-StartSubcarriers))=nprach-SubcarrierOffset+8+(4 modulo (12-8))=nprach-SubcarrierOffset+8.

Therefore, the resource presumed (assumed) by the base station apparatus 100 of Rel-13 does not match the resource presumed (assumed) by the user apparatus 200 of Rel-14, and thus, the random access procedure fails.

Therefore, in the random access procedure, the process for selecting the preamble sub-carrier is changed as shown below.

1) In the case where (ra-PreambleIndex modulo nprach-NumSubcarriers)>nprach-NumCBRA-StartSubcarriers, the preamble sub-carrier to be selected is nprach-SubcarrierOffset+nprach-NumCBRA-StartSubcarriers+(ra-PreambleIndex modulo (nprach-NumbSubcarriers−nprach-NumbCBRA-StartSubcarriers)).

2) In the case other than 1), that is, in the case where (ra-PreambleIndex modulo nprach-NumSubcarriers) is equal to or less than nprach-NumCBRA-StartSubcarriers, the preamble sub-carrier to be selected is nprach-SubcarrierOffset+(ra-PreambleIndex modulo nprach-NumbSubcarriers).

As described above, in the random access procedure, by changing the selection process of the preamble sub-carrier according to the parameter, the same preamble sub-carrier will be selected by the base station apparatus 100 and the user apparatus 200, the resource mismatch will not occur, and it will be possible to complete the random access procedure normally.

It should be noted that the user apparatus 200 may determine the value of "CF" field illustrated in FIG. 5 in the case where a non-contention based NPRACH resource is assigned to the preamble sub-carrier. In other words, for example, the "CF" field value may be determined in the case where the index of the sub-carrier of the preamble is "#8", "#9", "#10", or "#11" illustrated in FIG. 6A.

It should be noted that the base station apparatus 100 may set the value of "CF" field illustrated in FIG. 5 in the case where a non-contention based NPRACH resource is assigned to the preamble sub-carrier. In other words, for example, the base station apparatus 100 may set "1" as the "CF" field value in the case where the index of the sub-carrier of the preamble is "#8", "#9", "#10", or "#11" illustrated in FIG. 6A.

According to the embodiment 1 described above, by introducing the "CF" field, it is possible to enable a state of the base station apparatus 100 in which the random access procedure is the non-contention based random access procedure to match a state of the user apparatus 200 in which the random access procedure is the non-contention based random access procedure, and it is possible to complete the random access procedure properly. Further, in the random access procedure, by changing the selection process of the preamble sub-carrier according to the parameter, the same preamble sub-carrier will be selected by the base station apparatus 100 and the user apparatus 200, the resource mismatch will not occur, and it will be possible to complete the random access procedure properly.

In other words, it is possible to properly complete a random access procedure performed by a user apparatus and a base station apparatus in a wireless communication system.

Embodiment 2

In the following, an embodiment 2 will be described. Regarding the embodiment 2, the points different from the embodiment 1 will be described. Therefore, what is not particularly described is the same as in the embodiment 1.

As illustrated in FIG. 5, a "CF" field is newly set in the MAC payload included in the random access response, and, for example, in the case where "CF=1", it is indicated that the random access response is completed.

Further, a process of determining the "CF" field is added to the random access procedure as described below. It should be noted that it is assumed that the indicated preamble is not "000000".

1) In the case where the random access response is successfully received, where the user apparatus 200 does not correspond to NB-IoT, and where an indication for a preamble has been transmitted from the base station apparatus 100 to the user apparatus 200, the user apparatus 200 determines that the random access procedure is completed.

2) In the case where the random access response is successfully received, where the user apparatus 200 corresponds to NB-IoT, where an indication for a preamble has been transmitted from the base station apparatus 100 to the user apparatus 200, and where the "CF" field is "1", the user apparatus 200 determines that the random access procedure is completed.

It should be noted that the user apparatus 200 may determine the value of "CF" field illustrated in FIG. 5 in the case where a non-contention based NPRACH resource is assigned to the preamble sub-carrier. In other words, for example, the "CF" field value may be determined in the case where the index of the preamble sub-carrier is "#8", "#9", "#10", or "#11" illustrated in FIG. 6A.

It should be noted that the base station apparatus 100 may set the value of "CF" field illustrated in FIG. 5 in the case where a non-contention based NPRACH resource is assigned to the preamble sub-carrier. In other words, for example, the base station apparatus 100 may set "1" as the "CF" field value in the case where the index of the preamble sub-carrier is "#8", "#9", "#10", or "#11" illustrated in FIG. 6A.

According to the embodiment 2 described above, by introducing the "CF" field, it becomes possible to enable a state of the base station apparatus 100 to match a state of the user apparatus 200 and to complete the random access procedure properly by explicitly indicating that the random access procedure is completed.

Embodiment 3

In the following, an embodiment 3 will be described. Regarding the embodiment 3, the points different from the embodiment 1 will be described. Therefore, what is not particularly described may be the same as in the embodiment 1.

It is possible to cause the random access procedure presumed by the base station apparatus 100 to match the random access procedure presumed by the user apparatus 200 by newly introducing an RRC information element "CFRAsupport" and by transmitting the information indicating correspondence to the non-contention based random access procedure without newly setting a "CF" field in the MAC payload included in the random access response as illustrated in FIG. 5.

The RRC information element "CFRAsupport" is transmitted to the user apparatus 200 from the base station apparatus 100, together with or separately from the indication for the preamble to be used. The indication may be transmitted to the user apparatus 200 from the base station apparatus 100 via an individual RRC message, may be transmitted to the user apparatus 200 via broadcast information, or may be transmitted to the user apparatus 200 in advance before performing the non-contention based random access procedure. In the case where the indication is transmitted via an individual RRC message, the "CFRAsupport" may be set in the MAC-MainConfig Information Element in the RRCConnectionReconfiguration message, or the "CFRAsupport" may be set in the RACH-ConfigCommon Information Element. In the case where the indication is transmitted via the broadcast information, the "CFRAsupport" may be set in the RACH-ConfigCommon-NB Information Element included in the RadioResourceConfigCommonSIB Information Element in the SystemInformationBclockType2 message.

Further, the new RRC information element may be defined as "CFRAenabled" that permits the user apparatus 200 to perform the non-contention based random access procedure, and may be transmitted to the user apparatus 200 from the base station apparatus 100.

Further, a process of determining the RRC information element "CFRAsupport" is added to the random access procedure as described below. It should be noted that it is assumed that the indicated preamble is not "000000". It should be noted that the RRC information element "CFRAsupport" that is determined in the process described below may be referred to as "CFsupport", "CFRAenabled", etc.

1) In the case where the random access response is successfully received, where the user apparatus 200 does not correspond to NB-IoT, and where an indication for a preamble has been transmitted from the base station apparatus 100 to the user apparatus 200, the user apparatus 200 determines that the random access procedure is completed.

2) In the case where the random access response is successfully received, where the user apparatus 200 corresponds to NB-IoT, where an indication for a preamble has been transmitted from the base station apparatus 100 to the user apparatus 200, and where the RRC information element "CFRAsupport" is included in the indication, the user apparatus 200 determines that the random access procedure is completed.

According to the embodiment 3 described above, by introducing the RRC information element "CFRAsupport", it becomes possible to enable a state of the base station apparatus 100 in which the random access procedure is the non-contention based random access procedure to match a state of the user apparatus 200 in which the random access procedure is the non-contention based random access procedure, and it becomes possible to complete the random access procedure properly.

Embodiment 4

In the following, an embodiment 4 will be described. Regarding the embodiment 4, the points different from the embodiment 1 will be described. Therefore, what is not particularly described is the same as in the embodiment 1.

Regarding the selection of the sub-carrier of the random access preamble illustrated in FIG. 6A, the nprach-NumCBRA-StartSubcarriers is defined in the Rel-13 base station apparatus 100. Therefore, it is possible for the base station apparatus 100 to determine whether the preamble is individually assigned to the user apparatus 200 by determining whether the value of nprach-SubcarrierOffset+(ra-PreambleIndex modulo nprach-NumSubcarriers) is greater than nprach-SubcarrierOffset+nprach-NumCBRA-StartSubcarriers.

With respect to the above, similar to Rel-13, the selection of the preamble sub-carrier in Rel-14 is changed to be based on the following formula. nprach-SubcarrierOffset+(ra-PreambleIndex modulo nprach-NumSubcarriers)

According to the above change, it becomes possible for the NB-IoT user apparatus 200 corresponding to Rel-14 to select the same preamble sub-carrier as the Rel-13 base station apparatus 100, the resource mismatch does not occur, and it becomes possible to complete the random access procedure properly.

Similar to the embodiment 1, a “CF” field is newly set in the MAC payload included in the random access response illustrated in FIG. 5. For example, in the case where “CF=1”, it is indicated that the random access response corresponds to the non-contention based random access procedure, and, in the case where “CF=0”, it is indicated that the random access response corresponds to the contention based random access procedure. As illustrated in FIG. 5, for example, the “CF” field may be arranged at a bit in the fourth octet of the MAC payload.

Further, a process of determining the “CF” field is added to the random access procedure as described below. It should be noted that it is assumed that the indicated preamble is not “000000”.

1) In the case where the random access response is successfully received, where the user apparatus 200 does not correspond to NB-IoT, and where an indication for a preamble has been transmitted from the base station apparatus 100 to the user apparatus 200, the user apparatus 200 determines that the random access procedure is completed.

2) In the case where the random access response is successfully received, where the user apparatus 200 corresponds to NB-IoT, where an indication for a preamble has been transmitted from the base station apparatus 100 to the user apparatus 200, and where the “CF” field is “1”, the user apparatus 200 determines that the random access procedure is completed.

As described above, by introducing the “CF” field, it becomes possible to enable a state of the base station apparatus 100 in which the random access procedure is the non-contention based random access procedure to match a state of the user apparatus 200 in which the random access procedure is the non-contention based random access procedure, and it becomes possible to properly complete the random access procedure.

It should be noted that the user apparatus 200 may determine the value of “CF” field illustrated in FIG. 5 in the case where a non-contention based NPRACH resource is assigned to the preamble sub-carrier. In other words, for example, the “CF” field value may be determined in the case where the index of the sub-carrier of the preamble is “#8”, “#9”, “#10”, or “#11” illustrated in FIG. 6A.

It should be noted that the base station apparatus 100 may set the value of “CF” field illustrated in FIG. 5 in the case where a non-contention based NPRACH resource is assigned to the preamble sub-carrier. In other words, for example, the base station apparatus 100 may set “1” as the “CF” field value in the case where the index of the sub-carrier of the preamble is “#8”, “#9”, “#10”, or “#11” illustrated in FIG. 6A.

According to the embodiment 4 described above, by introducing the “CF” field, it becomes possible to enable a state of the base station apparatus 100 in which the random access procedure is the non-contention based random access procedure to match a state of the user apparatus 200 in which the random access procedure is the non-contention based random access procedure, and it becomes possible to complete the random access procedure properly.

Embodiment 5

In the following, an embodiment 5 will be described. Regarding the embodiment 5, the points different from the embodiment 2 will be described. Therefore, what is not particularly described is the same as in the embodiment 2.

Regarding the selection of the sub-carrier of the random access preamble illustrated in FIG. 6A, nprach-NumCBRA-StartSubcarriers is defined in the Rel-13 base station apparatus 100. Therefore, it is possible for the base station apparatus 100 to determine whether the preamble is individually assigned to the user apparatus 200 by determining whether the value of nprach-SubcarrierOffset+(ra-PreambleIndex modulo nprach-NumSubcarriers) is greater than nprach-SubcarrierOffset+nprach-NumCBRA-StartSubcarriers.

With respect to the above, similar to Rel-13, the selecting of the preamble sub-carrier in Rel-14 is changed to be based on the following formula. nprach-SubcarrierOffset+(ra-PreambleIndex modulo nprach-NumSubcarriers)

According to the above change, it becomes possible for the NB-IoT user apparatus 200 corresponding to Rel-14 to select the same preamble sub-carrier as the Rel-13 base station apparatus 100, the resource mismatch does not occur, and it becomes possible to complete the random access procedure properly.

Similar to the embodiment 2, a “CF” field is newly set in the MAC payload included in the random access response illustrated in FIG. 5, and, for example, in the case where “CF=1”, it is indicated that the random access response is completed.

Further, a process of determining the “CF” field is added to the random access procedure as described below. It should be noted that it is assumed that the indicated preamble is not “000000”. 1) In the case where the random access response is successfully received, where the user apparatus 200 does not correspond to NB-IoT, and where an indication for a preamble has been transmitted from the base station apparatus 100 to the user apparatus 200, the user apparatus 200 determines that the random access procedure is completed.

2) In the case where the random access response is successfully received, where the user apparatus 200 corresponds to NB-IoT, where an indication for a preamble has been transmitted from the base station apparatus 100 to the user apparatus 200, and where the “CF” field is “1”, the user apparatus 200 determines that the random access procedure is completed.

It should be noted that the user apparatus 200 may determine the value of “CF” field illustrated in FIG. 5 in the case where a non-contention based NPRACH resource is assigned to the preamble sub-carrier. In other words, for example, the “CF” field value may be determined in the case where the index of the preamble sub-carrier is “#8”, “#9”, “#10”, or “#11” illustrated in FIG. 6A.

It should be noted that the base station apparatus 100 may set the value of “CF” field illustrated in FIG. 5 in the case where a non-contention based NPRACH resource is assigned to the preamble sub-carrier. In other words, for example, the base station apparatus 100 may set “1” as the “CF” field value in the case where the index of the preamble sub-carrier is “#8”, “#9”, “#10”, or “#11” illustrated in FIG. 6A.

According to the embodiment 5 described above, by introducing the “CF” field, it is possible to enable a state of the base station apparatus 100 to match a state of the user apparatus 200 and to complete the random access procedure properly by explicitly indicating that the random access procedure is completed.

Embodiment 6

In the following, an embodiment 6 will be described. Regarding the embodiment 6, the points different from the embodiment 3 will be described. Therefore, what is not particularly described is the same as in the embodiment 3.

Regarding the selection of the sub-carrier of the random access preamble illustrated in FIG. 6A, nprach-NumCBRA-StartSubcarriers is defined in the Rel-13 base station apparatus 100. Therefore, it is possible for the base station apparatus 100 to determine whether the preamble is individually assigned to the user apparatus 200 by determining whether the value of nprach-SubcarrierOffset+(ra-PreambleIndex modulo nprach-NumSubcarriers) is greater than nprach-SubcarrierOffset+nprach-NumCBRA-StartSubcarriers.

With respect to the above, similar to Rel-13, the selecting of the preamble sub-carrier in Rel-14 is changed to be based on the following formula. nprach-SubcarrierOffset+(ra-PreambleIndex modulo nprach-NumSubcarriers)

According to the above change, it becomes possible for the NB-IoT user apparatus 200 corresponding to Rel-14 to select the same preamble sub-carrier as the Rel-13 base station apparatus 100, the resource mismatch does not occur, and it becomes possible to complete the random access procedure properly.

Similar to the embodiment 3, it is possible to cause the random access procedure presumed by the base station apparatus 100 to match the random access procedure presumed by the user apparatus 200 by newly introducing an RRC information element "CFRAsupport" and by transmitting the information indicating correspondence to the non-contention based random access procedure without newly setting a "CF" field in the MAC payload included in the random access response as illustrated in FIG. 5.

The RRC information element "CFRAsupport" is transmitted to the user apparatus 200 from the base station apparatus 100, together with or separately from the indication for the preamble to be used. The indication may be transmitted to the user apparatus 200 from the base station apparatus 100 via an individual RRC message, may be transmitted to the user apparatus 200 via broadcast information, or may be transmitted to the user apparatus 200 in advance before performing the non-contention based random access procedure. In the case where the indication is transmitted via an individual RRC message, the "CFRAsupport" may be set in the MAC-MainConfig Information Element in the RRCConnectionReconfiguration message, or the "CFRAsupport" may be set in the RACH-ConfigCommon Information Element. In the case where the indication is transmitted via the broadcast information, the "CFRAsupport" may be set in the RACH-ConfigCommon-NB Information Element included in the RadioResourceConfigCommonSIB Information Element in the SystemInformationBclockType2 message.

Further, the new RRC information element may be defined as "CFRAenabled" that permits the user apparatus 200 to perform the non-contention based random access procedure, and may be transmitted to the user apparatus 200 from the base station apparatus 100.

Further, a process of determining the RRC information element "CFRAsupport" is added to the random access procedure as described below. It should be noted that it is assumed that the indicated preamble is not "000000". It should be noted that the RRC information element "CFRAsupport" that is determined in the process described below may be referred to as "CFsupport", "CFRAenabled", etc.

1) In the case where the random access response is successfully received, where the user apparatus 200 does not correspond to NB-IoT, and where an indication for a preamble has been transmitted from the base station apparatus 100 to the user apparatus 200, the user apparatus 200 determines that the random access procedure is completed.

2) In the case where the random access response is successfully received, where the user apparatus 200 corresponds to NB-IoT, where an indication for a preamble has been transmitted from the base station apparatus 100 to the user apparatus 200, and where the RRC information element "CFRAsupport" is included in the indication, the user apparatus 200 determines that the random access procedure is completed.

According to the embodiment 6 described above, by introducing the RRC information element "CFRAsupport", it becomes possible to enable a state of the base station apparatus 10 in which the random access procedure is the non-contention based random access procedure to match a state of the user apparatus 200 in which the random access procedure is the non-contention based random access procedure, and it becomes possible to complete the random access procedure properly.

Embodiment 7

In the following, an embodiment 7 will be described. Regarding the embodiment 7, the points different from the embodiment 3 will be described. Therefore, what is not particularly described is the same as in the embodiment 3.

It is possible to cause the random access procedure presumed by the base station apparatus 100 to match the random access procedure presumed by the user apparatus 200 by newly introducing an RRC information element "CFRAsupport" and by transmitting the information indicating correspondence to the non-contention based random access procedure without newly setting a "CF" field in the MAC payload included in the random access response as illustrated in FIG. 5.

The RRC information element "CFRAsupport" is transmitted to the user apparatus 200 from the base station apparatus 100, together with or separately from the indication for the preamble to be used. The indication may be transmitted to the user apparatus 200 from the base station apparatus 100 via an individual RRC message, may be transmitted to the user apparatus 200 via broadcast information, or may be transmitted to the user apparatus 200 in advance before performing the non-contention based random access procedure. In the case where the indication is transmitted via an individual RRC message, the CFRAsupport" may be set in the RACH-ConfigCommon-NB Information Element included in the RRCConnectionReconfiguration message. In the case where the indication is transmitted via the broadcast information, the "CFRAsupport" may be set in the RACH-ConfigCommon-NB Information Element included in the RadioResourceConfigCommonSIB-NB Information Element in the SystemInformationBclockType2-NB message. The RACH-ConfigCommon-NB is an RRC message in which information related to the random access setting is included.

Further, the new RRC information element may be defined as "CFRAenabled" that permits the user apparatus 200 to perform the non-contention based random access procedure, and may be transmitted to the user apparatus 200 from the base station apparatus 100.

Further, a process of determining the RRC information element "CFRAsupport" is added to the random access procedure as described below. It should be noted that it is assumed that the indicated preamble is not "000000". It should be noted that the RRC information element "CFRAsupport" that is determined in the process described below may be referred to as "CFsupport", "CFRAenabled", etc.

1) In the case where the random access response is successfully received, where the user apparatus 200 does not correspond to NB-IoT, and where an indication for a preamble has been transmitted from the base station apparatus 100 to the user apparatus 200, the user apparatus 200 determines that the random access procedure is successfully completed.

2) In the case where the random access response is successfully received, where the user apparatus 200 corresponds to NB-IoT, where an indication for a preamble has been transmitted from the base station apparatus 100 to the user apparatus 200, and where the RRC information element "CFRAsupport" is included in the "RACH-ConfigCommon-NB", the user apparatus 200 determines that the random access procedure is successfully completed.

Further, in the random access resource selection, the process of the user apparatus 200 for selecting the preamble sub-carrier indicated by the base station apparatus 100 will be changed as shown below. It should be noted that it is assumed that the indicated preamble is not "000000".

1) In the case where "CFRAsupport" is included in "RACH-ConfigCommon-NB", the sub-carrier of the random access preamble is set as nprach-SubcarrierOffset+nprach-NumCBRA-StartSubcarriers+(ra-PreambleIndex modulo (nprach-NumbSubcarriers−nprach-NumCBRA-StartSubcarriers)).

2) In case of not 1), that is, in the case where "CFRAsupport" is not included in "RACH-ConfigCommon-NB", the sub-carrier of the random access preamble is set as nprach-SubcarrierOffset+(ra-PreambleIndex modulo nprach-NumbSubcarriers).

It should be noted that, in the process described above, "the case where the RRC information element "CFRAsupport" is included in "RACH-ConfigCommon-NB"" may be "the case where the RRC information element "CFRAsupport" is set as "true" and included in "RACH-ConfigCommon-NB"".

According to the embodiment 7 described above, by introducing the RRC information element "CFRAsupport", it becomes possible to enable a state of the base station apparatus 100 in which the random access procedure is the non-contention based random access procedure to match a state of the user apparatus 200 in which the random access procedure is the non-contention based random access procedure, and it becomes possible to complete the random access procedure properly.

Further, by changing the selection process of the preamble sub-carrier based on the RRC information element "CFRAsupport" as in the embodiment 7 described above, the same preamble sub-carrier will be selected by the base station apparatus 100 and the user apparatus 200, the resource mismatch will not occur, and it becomes possible to complete the random access procedure properly.

(Apparatus Structure)

Next, examples of functional structures of the base station apparatus 100 and the user apparatus 200 that perform the processes and operations described above will be described. The base station apparatus 100 and the user apparatus 200 each have at least functions for performing the embodiments 1-7. It should be noted that the base station apparatus 100 and the user apparatus 200 may each have only a part of the functions for performing the embodiments 1-7.

<Base Station Apparatus 100>

Figure 7:
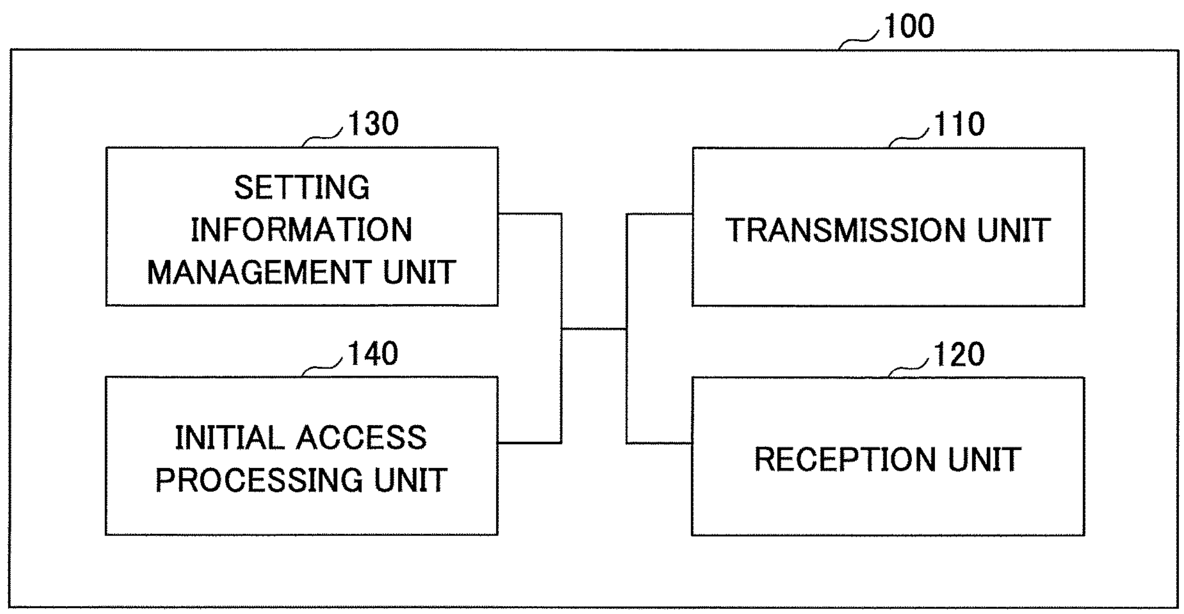
FIG. 7 is an example of a functional structure of a base station apparatus 100.

FIG. 7 is a drawing illustrating an example of a functional structure of a base station apparatus 100. As illustrated in FIG. 7, the base station apparatus 100 includes a transmission unit 110, a reception unit 120, a setting information management unit 130, and an initial access processing unit 140. The functional structure illustrated in FIG. 7 is merely an example. Functional divisions and names of functional units may be anything as long as it can perform operations according to an embodiment of the present invention.

The transmission unit 110 has functions for generating a signal to be transmitted to the user apparatus 200 and for transmitting the signal wirelessly. The reception unit 120 has functions for receiving various signals transmitted from the user apparatus 200 and for obtaining, for example, upper layer information from the received signals. Further, the transmission unit 110 has functions for transmitting to the user apparatus 200 a PSS, SSS, PBCH, DL/UL control signal, etc. Further, the transmission unit 110 transmits to the user apparatus 200 information related to transmission power control and information related to scheduling, and the reception unit 120 receives from the user apparatus 200 a message related to a preamble and an initial access.

The setting information management unit 130 stores preset setting information and various setting information items to be transmitted to the user apparatus 200. Contents of the setting information are, for example, information to be used for the initial access, etc.

The initial access processing unit 140 controls transmission of a synchronization signal from the base station apparatus 100 to the user apparatus 200 and transmission of information used for the initial access. The initial access processing unit 140 also controls the initial access and the random access from the user apparatus 200.

<User Apparatus 200>

Figure 8:
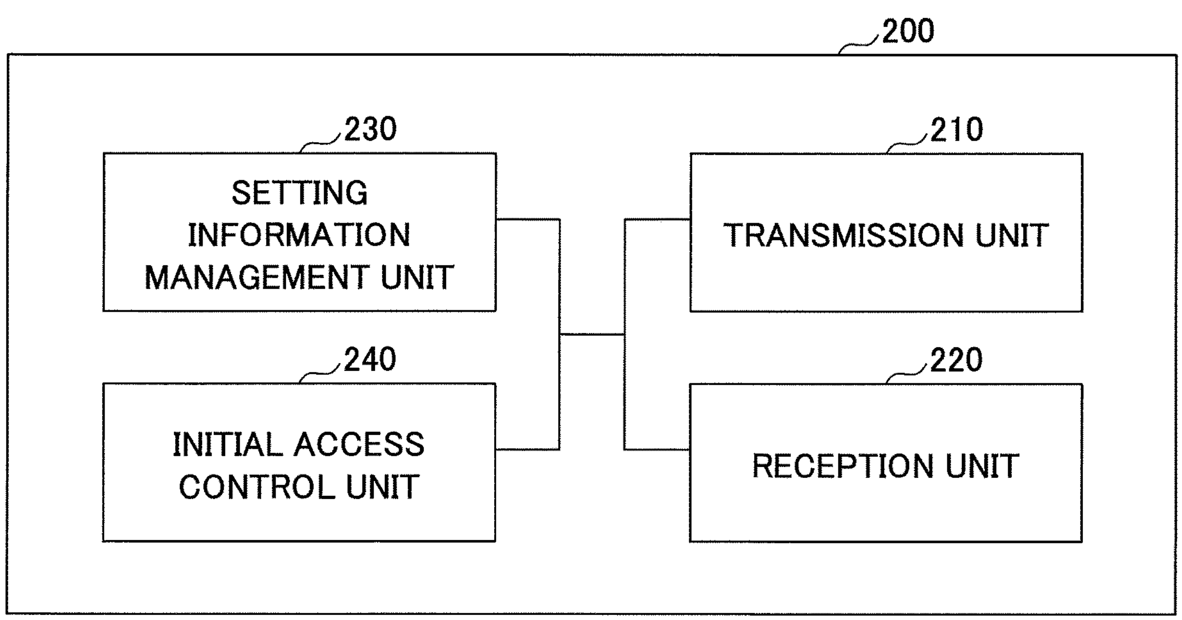
FIG. 8 is an example of a functional structure of a user apparatus 200.

FIG. 8 is a drawing illustrating an example of a functional structure of a user apparatus 200. As illustrated in FIG. 8, the user apparatus 200 includes a transmission unit 210, a reception unit 220, a setting information management unit 230, and an initial access control unit 240. The functional structure illustrated in FIG. 8 is merely an example. Functional divisions and names of functional units may be anything as long as it can perform operations according to an embodiment of the present invention.

The transmission unit 210 generates a transmission signal from transmission data and transmits the transmission signal wirelessly. The reception unit 220 receives various signals wirelessly and obtains upper layer signals from the received physical layer signals. Further, the reception unit 220 has functions for receiving a PSS, a SSS, a PBCH, a DL/UL control signal, etc., transmitted from the base station apparatus 100. Further, the transmission unit 210 transmits to the base station apparatus 100 a message related to a preamble and an initial access, and the reception unit 220 receives from the base station apparatus 100 information to be used for the initial access.

The setting information management unit 230 stores various setting information items received by the reception unit 220 from the base station apparatus 100. Further, the setting information management unit 230 also stores preset setting information. Contents of the setting information are, for example, information to be used for the initial access, etc.

The initial access control unit 240 controls the initial access and the random access of the user apparatus 200 described in the embodiment 1 to 7. It should be noted that the functional units related to preamble signal transmission, etc., in the initial access control unit 240 may be included in the transmission unit 210, and the functional units related to system information reception, etc., in the initial access control unit 240 may be included in the reception unit 220.

(Hardware Structure)

In the above functional structure diagrams used for describing an embodiment of the present invention (FIG. 7 and FIG. 8), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are physically and/or logically coupled to each other, or may be realized by two or more apparatuses that are physically and/or logically separated and are physically and/or logically connected (e.g., wiredly and/or wirelessly).

Figure 9:
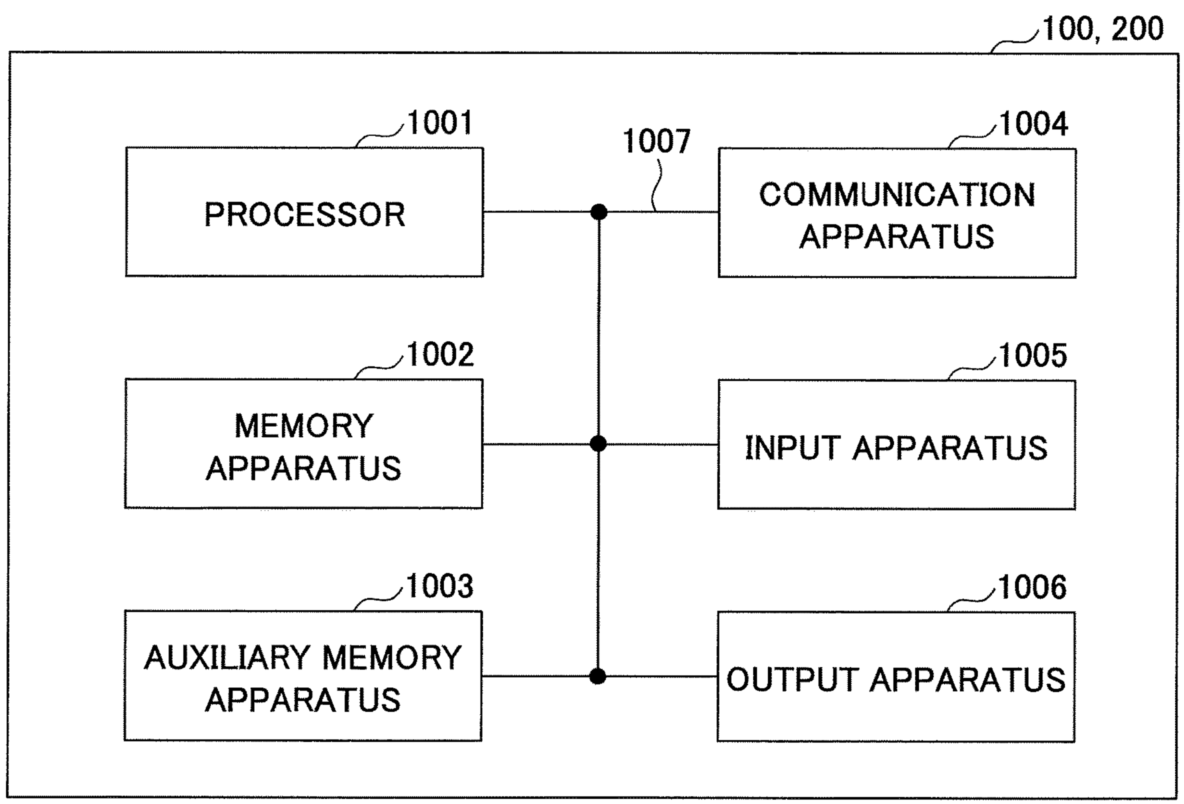
FIG. 9 is a drawing illustrating examples of hardware structures of the base station apparatus 100 and the user apparatus 200.

Further, for example, a base station apparatus 100 and a user apparatus 200 according to an embodiment of the present invention may function as computers that perform processes according to an embodiment of the present invention. FIG. 9 is a drawing illustrating an example of a hardware structure of a wireless communication apparatus that is a base station apparatus 100 or a user apparatus 200 according to an embodiment of the present invention. Each of the base station apparatus 100 and the user apparatus 200 may be physically a computer apparatus including a processor 1001, a storage apparatus 1002, an auxiliary storage apparatus 1003, a communication apparatus 1004, an input apparatus 1005, an output apparatus 1006, a bus 1007, etc.

It should be noted that, in the descriptions below, the term "apparatus" can be read as a circuit, a device, a unit, etc. The hardware structures of the base station apparatus 100 and the user apparatus 200 may include one or more of each of the apparatuses indicated by 1001 to 1006 illustrated in the figure, or may not include some apparatuses.

Each of the functions of the base station apparatus 100 and the user apparatus 200 is realized by causing predetermined software (program) to be read by hardware such as the processor 1001, the storage apparatus 1002, or the like, by causing the processor 1001 to perform calculations, and by causing the processor 1001 to control communications by the communication apparatus 1004, and to control reading and/or writing data by the storage apparatus 1002 and the auxiliary storage apparatus 1003.

The processor 1001 controls the entire computer by, for example, controlling an operating system. The processor 1001 may include a central processing unit (CPU) including an interface with a peripheral apparatus, a control apparatus, a calculation apparatus, a register, etc.

Further, the processor 1001 reads a program (program code), a software module, or data from the auxiliary storage apparatus 1003 and/or the communication apparatus 1004, writes the program, the software module, or the data to the storage apparatus 1002, and performs various processes according to the program, the software module, or the data. As the program, a program is used that causes the computer to perform at least a part of operations according to an embodiment of the present invention described above. For example, the transmission unit 110, the reception unit 120, the setting information management unit 130, and the initial access processing unit 140 of the base station apparatus 100 illustrated in FIG. 7 may be realized by control programs that are stored in the storage apparatus 1002 and are executed by the processor 1001. Further, for example, the transmission unit 210, the reception unit 220, the setting information management unit 230, and the initial access control unit 240 of the user apparatus 200 illustrated in FIG. 8 may be realized by control programs that are stored in the storage apparatus 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage apparatus 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage apparatus 1002 may be referred to as a register, a cache, a main memory, etc. The storage apparatus 1002 is enabled to store programs (program codes), software modules, or the like, that are executable for performing processes according to an embodiment of the present invention.

The auxiliary storage apparatus 1003 is a computer-readable recording medium, and may include at least one of, for example, an optical disk such as a CD-ROM (Compact Disc ROM), a hard disk drive, a flexible disk, a magneto optical disk (e.g., compact disk, digital versatile disk, Blu-ray (registered trademark) disk), a smart card, a flash memory (e.g., card, stick, key drive), a floppy (registered trademark) disk, a magnetic strip, etc. The auxiliary storage apparatus 1003 may be referred to as an auxiliary storage apparatus. The above recording medium may be a database including the storage apparatus 1002 and/or the auxiliary storage apparatus 1003, a server, or any other appropriate medium.

The communication apparatus 1004 is hardware (transmission and reception device) for communicating with computers via a wired and/or wireless network, and may be referred to as a network device, a network controller, a network card, a communication module, etc. For example, the transmission unit 110 and the reception unit 120 of the base station apparatus 100 may be realized by the communication apparatus 1004. Further, the transmission unit 210 and the reception unit 220 of the user apparatus 200 may be realized by the communication apparatus 1004.

The input apparatus 1005 is an input device that receives an external input (e.g., keyboard, mouse, microphone, switch, button, sensor). The output apparatus 1006 is an output device that outputs something to the outside (e.g., display, speaker, LED lamp). It should be noted that the input apparatus 1005 and the output apparatus 1006 may be integrated into a single apparatus (e.g., touch panel).

Further, the apparatuses including the processor 1001, the storage apparatus 1002, etc., are connected to each other via the bus 1007 used for communicating information. The bus 1007 may include a single bus, or may include different buses between the apparatuses.

Further, each of the base station apparatus 100 and the user apparatus 200 may include hardware such as a micro processor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Summary of Embodiments

As described above, according to an embodiment of the present invention, a user apparatus that communicates with a base station apparatus is provided. The user apparatus includes a reception unit configured to receive an indication for an individual random access preamble, information indicating correspondence to non-contention based random access procedure, and a random access response; a transmission unit configured to transmit the individual random access preamble to the base station apparatus; and a control unit configured to, in response to receiving the random access response to the individual random access preamble transmitted from the base station apparatus, determine whether the random access procedure has been successfully completed based on the information indicating correspondence to the non-contention based random access procedure.

According to the above arrangement, it is possible to enable a state of the base station apparatus in which the random access procedure is the non-contention based random access procedure to match a state of the user apparatus in which the random access procedure is the non-contention based random access procedure, and it is possible to properly complete the random access procedure. In other words, it is possible to properly complete a random access procedure performed by a user apparatus and a base station apparatus in a wireless communication system. The information indicating correspondence to the non-contention based random access procedure may be information transmitted with the indication for the individual random access preamble, or may be information transmitted separately from the indication for the individual random access preamble, via a radio resource control message related to random access setting. According to the above arrangement, by explicitly indicating that the random access procedure has been completed, it is possible to enable a state of the base station apparatus to match a state of the user apparatus and it is possible to properly complete the random access procedure.

In the case where the indication for the individual random access preamble is received, the process for selecting the sub-carrier of the individual random access preamble may be changed based on the information indicating correspondence to the non-contention based random access procedure. According to the above arrangement, in the random access procedure, by changing the selection process of the preamble sub-carrier according to the parameter, the same preamble sub-carrier is selected by the base station apparatus 100 and the user apparatus 200, the resource mismatch does not occur, and it is possible to complete the random access procedure properly.

In the case where the information indicating correspondence to the non-contention base random access procedure has been transmitted, the sub-carrier position of the individual random access preamble may be obtained by adding the number of sub-carriers used in a contention based random access procedure and a remainder value to an offset position of sub-carriers used in a random access, the remainder value being obtained by dividing a preamble index included in the individual random access preamble by a subtracted number, the subtracted number being obtained by subtracting the number of sub-carriers used in the contention based random access procedure from the number of the sub-carriers used in the random access, and in the case where the information indicating correspondence to the non-contention based random access procedure has not been transmitted, the sub-carrier position of the individual random access preamble is obtained by adding a remainder value to the offset position of the sub-carriers used in random access, the remainder value being obtained by dividing a preamble index included in the individual random access preamble by the number of the sub-carriers used in the random access. According to the above arrangement, in the random access procedure, by appropriately selecting the preamble sub-carrier according to the parameter, the same preamble sub-carrier is selected by the base station apparatus 100 and the user apparatus 200, the resource mismatch does not occur, and it is possible to complete the random access procedure properly.

A base station apparatus that communicates with a user apparatus is provided. The base station apparatus includes a transmission unit configured to transmit an indication for an individual random access preamble, information indicating correspondence to a non-contention based random access procedure, and a random access response to the user apparatus; a reception unit configured to receive the individual random access preamble from the user apparatus; and a setting unit configured to set the information indicating correspondence to the non-contention based random access procedure in a radio resource control message related to random access setting. The radio resource control message is transmitted together with the indication for the individual random access preamble, or transmitted separately from the indication for the individual random access preamble.

According to the above arrangement, it is possible to enable a state of the base station apparatus in which the random access procedure is the non-contention based random access procedure to match a state of the user apparatus in which the random access procedure is the non-contention based random access procedure, and it is possible to properly complete the random access procedure. In other words, it is possible to properly complete a random access procedure performed by a user apparatus and a base station apparatus in a wireless communication system.

Supplement to Embodiments

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, a user apparatus UE, or a base station eNB has been described by using functional block diagrams. However, the apparatuses may be realized by hardware, software, or a combination of hardware and software. The software executed by a processor included in a user apparatus UE according to an embodiment of the present invention and the software executed by a processor included in a base station eNB according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information transmission (notification, reporting) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, an RRC message may be referred to as RRC signaling. Further, an RRC message may be, for example, an RRC connection setup message, an RRC connection reconfiguration message, or the like.

An aspect/embodiment described in the present specification may be applied to a system that uses LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), other appropriate systems, and/or a next generation system enhanced based thereon.

The order of processing steps, sequences or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station apparatus 100 in the present specification, may be performed by an upper node in some cases. In a network including one or more network nodes including a base station apparatus 100, it is apparent that various operations performed for communicating with a user apparatus 200 may be performed by the base station apparatus 100 and/or another network node other than the base station apparatus 100 (for example, but not limited to, MME or S-GW). According to the above, a case is described in which there is a single network node other than the base station apparatus 100. However, a combination of multiple other network nodes may be considered (e.g., MME and S-GW).

An aspect/embodiment described in the present specification may be used independently, may be used in combination, or may be used by switching according to operations.

There is a case in which the user apparatus 200 may be referred to, by a person skilled in the art, as a subscriber station, a mobile unit, subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

There is a case in which the base station apparatus 100 may be referred to, by a person skilled in the art, as a NB (NodeB), an eNB (enhanced NodeB), a gNB, a base station, or some other appropriate terms.

As used herein, the term "determining" may encompasses a wide variety of actions. The "determining" may include, for example, a case in which "judging", "calculating", "computing", "processing", "deriving", "investigating", "looking up" (e.g., looking up a table, database, or other data structures), or "ascertaining" is deemed as "determining". Also, "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining".

As used herein, the phrase "based on" does not mean, unless otherwise noted, "based on only". In other words, the phrase "base on" means both "based on only" and "based on at least".

When the terms "include", "including", and variations thereof are used in the present specification or in the claims, the terms are intended to be non-restrictive (to be considered "open terminology") the same as the term "comprising". Further, the term "or" used in the present specification or in the claims is intended to be not an "exclusive or".

Throughout the present specification, in the case where articles "a", "an", and "the" are added to a noun as a result of translation, unless otherwise indicated, the noun may be plural.

It should be noted that, in an embodiment of the present invention, the initial access control unit 240 is an example of a control unit. The initial access processing unit 140 is an example of a setting unit. "CFRAsupport" is an example of information indicating correspondence to the non-contention based random access procedure. "RACH-ConfigCommon-NB" is an example of a radio resource control message related to the random access setting. "nprach-NumCBRA-StartSubcarriers" is an example of the number of subcarriers used in the contention based random access procedure. "ra-PreambleIndex" is an example of a preamble index. "nprach-NumSubcarriers" is an example of the number of sub-carriers used in the random access. "nprach-SubcarrierOffset" is an example indicating an offset position of the sub-carrier used in the random access.

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. In other words, the descriptions of the present specification are for illustrative purposes only, and are not intended to be limitations to the present invention.

The present application is based on and claims the benefit of priority of Japanese Priority Application No. 2017-160640 filed on Aug. 23, 2017, the entire contents of which are hereby incorporated by reference.

DESCRIPTION OF THE REFERENCE NUMERALS

100 Base station apparatus
200 User apparatus
110 Transmission unit
120 Reception unit
130 Setting information management unit
140 Initial access processing unit

200 User apparatus
210 Transmission unit
220 Reception unit
230 Setting information management unit
240 Initial access control unit
1001 Processor
1002 Storage apparatus
1003 Auxiliary storage apparatus
1004 Communication apparatus
1005 Input apparatus
1006 Output apparatus

What is claimed is:

1. A user apparatus that communicates with a base station apparatus, the user apparatus comprising:

a reception unit configured to receive, from the base station apparatus, an indication for an individual random access preamble, information indicating correspondence to a non-contention based random access procedure, and a random access response;

a transmission unit configured to transmit the individual random access preamble to the base station apparatus; and a control unit configured, in response to receiving the random access response to the individual random access preamble, to determine whether the random access procedure is successfully completed based on the information indicating correspondence to the non-contention based random access procedure, the random access response being transmitted from the base station apparatus, wherein, in the case where the indication for the individual random access preamble is received, a process for selecting a sub-carrier of the individual random access preamble is changed based on the information indicating correspondence to the non-contention based random access procedure.

2. The user apparatus according to claim 1, wherein the information indicating correspondence to the non-contention based random access procedure is information transmitted via an individual radio resource control message.

3. The user apparatus according to claim 1, wherein:

in the case where the information indicating correspondence to the non-contention based random access procedure has been transmitted, a sub-carrier position of the individual random access preamble is obtained by adding the number of sub-carriers used in a contention based random access procedure and a remainder value to an offset position of sub-carriers used in random access, the remainder value being obtained by dividing a preamble index included in the individual random access preamble by a subtracted number, the subtracted number being obtained by subtracting the number of sub-carriers used in the contention based random access procedure from the number of the sub-carriers used in random access; and in the case where the information indicating correspondence to the non-contention based random access procedure has not been transmitted, the sub-carrier position of the individual random access preamble is obtained by adding a remainder value to the offset position of the sub-carriers used in random access, the remainder value being obtained by dividing a preamble index included in the individual random access preamble by the number of the sub-carriers used in random access.

4. A base station apparatus that communicates with a user apparatus, the base station apparatus comprising:

a transmission unit configured to transmit, to the user apparatus, an indication for an individual random access preamble, information indicating correspondence to a non-contention based random access procedure, and a random access response;

a reception unit configured to receive the individual random access preamble from the user apparatus; and a setting unit configured to set the information indicating correspondence to the non-contention based random access procedure in a radio resource control message, wherein the radio resource control message is individually transmitted to the user apparatus, and in the case where the indication for the individual random access preamble is transmitted, a process for selecting a sub-carrier of the individual random access preamble is changed based on the information indicating correspondence to the non-contention based random access procedure.

5. The user apparatus according to claim 2, wherein:

in the case where the information indicating correspondence to the non-contention based random access procedure has been transmitted, a sub-carrier position of the individual random access preamble is obtained by adding the number of sub-carriers used in a contention based random access procedure and a remainder value to an offset position of sub-carriers used in random access, the remainder value being obtained by dividing a preamble index included in the individual random access preamble by a subtracted number, the subtracted number being obtained by subtracting the number of sub-carriers used in the contention based random access procedure from the number of the sub-carriers used in random access; and in the case where the information indicating correspondence to the non-contention based random access procedure has not been transmitted, the sub-carrier position of the individual random access preamble is obtained by adding a remainder value to the offset position of the sub-carriers used in random access, the remainder value being obtained by dividing a preamble index included in the individual random access preamble by the number of the sub-carriers used in random access.

* * * * *